US012427919B2

(12) United States Patent
Kozono

(10) Patent No.: US 12,427,919 B2
(45) Date of Patent: Sep. 30, 2025

(54) VEHICLE BLIND-SPOT REDUCTION DEVICE

(71) Applicant: SUBARU CORPORATION, Tokyo (JP)

(72) Inventor: Kazuya Kozono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 542 days.

(21) Appl. No.: 17/379,264

(22) Filed: Jul. 19, 2021

(65) Prior Publication Data

US 2022/0032846 A1    Feb. 3, 2022

(30) Foreign Application Priority Data

Jul. 29, 2020 (JP) ................................ 2020-127936

(51) Int. Cl.
*B60R 1/072* (2006.01)
*B60N 2/00* (2006.01)
*B60N 2/02* (2006.01)

(52) U.S. Cl.
CPC ............ *B60R 1/072* (2013.01); *B60N 2/0027* (2023.08); *B60N 2/0248* (2013.01); *B60N 2210/24* (2023.08)

(58) Field of Classification Search
CPC .... B60R 1/072; B60N 2/0027; B60N 2/0248; B60N 2210/24
See application file for complete search history.

(56) References Cited

U.S. PATENT DOCUMENTS 6,193,380 B1 * 2/2001 Jacobs .................. G08G 1/167
340/904
7,354,166 B2 * 4/2008 Qualich .................. B60R 1/081
359/877

(Continued)

FOREIGN PATENT DOCUMENTS

CN    205971058 U    2/2017
JP    S61-102346 A   5/1986

(Continued)

OTHER PUBLICATIONS

Office Action issued in corresponding Japanese Patent Application No. 2020-127936, dated Dec. 5, 2023 w/English MT.

(Continued)

*Primary Examiner* — Erin D Bishop
*Assistant Examiner* — Shivam Sharma
(74) *Attorney, Agent, or Firm* — Rimon P.C.

(57) ABSTRACT

A vehicle blind-spot reduction device includes side-view mirrors on sides of a vehicle, an actuator configured to move an optical display of each of the side-view mirrors, a detector configured to detect a display position of the optical display, a surrounding environment information acquirer configured to acquire environment information on surrounding of the vehicle, a moving object detector configured to detect a moving object running beside the vehicle on the basis of the surrounding environment information, a blind spot setter configured to set a blind spot of each of the side-view mirrors on the basis of the display position of the optical display, and a display surface adjuster. Based on determining that the moving object has entered the blind spot, the display surface adjuster causes the actuator to operate to adjust the display position of the optical display.

10 Claims, 13 Drawing Sheets

(56) References Cited

U.S. PATENT DOCUMENTS

| | | | |
|---|---|---|---|
| 2003/0007240 A1* | 1/2003 | Blum | G02F 1/292 |
| | | | 359/846 |
| 2003/0025597 A1* | 2/2003 | Schofield | G08G 1/163 |
| | | | 340/901 |
| 2015/0165976 A1* | 6/2015 | Choi | B60R 1/007 |
| | | | 359/876 |
| 2015/0353011 A1* | 12/2015 | Baek | B60R 1/27 |
| | | | 348/148 |
| 2017/0101058 A1 | 4/2017 | Park | |
| 2018/0157038 A1* | 6/2018 | Kabe | G02B 27/0101 |
| 2018/0201192 A1 | 7/2018 | Ishida | |
| 2019/0210529 A1 | 7/2019 | Izumi | |

FOREIGN PATENT DOCUMENTS

| | | |
|---|---|---|
| JP | 2009-020570 A | 1/2009 |
| JP | 2016-057490 A | 4/2016 |
| JP | 2017-214036 A | 12/2017 |
| JP | 2018-034715 A | 3/2018 |
| JP | 2018-092291 A | 6/2018 |
| JP | 2018-116516 A | 7/2018 |
| KR | 2013-0039000 A | 4/2013 |

OTHER PUBLICATIONS

Notice of Reasons for Refusal received in corresponding Japanese Patent Application No. 2020-127936, dated Apr. 30, 2024.

* cited by examiner

VEHICLE BLIND-SPOT REDUCTION DEVICE

CROSS-REFERENCE TO RELATED APPLICATIONS

The present application claims priority from Japanese Patent Application No. 2020-127936 filed on Jul. 29, 2020, the entire contents of which are hereby incorporated by reference.

BACKGROUND

The disclosure relates to a vehicle blind-spot reduction device that enables a driver to see a moving object that approaches surroundings of a vehicle by adjusting a display surface of a side-view mirror if the moving object has entered a blind spot of the side-view mirror.

To change the direction of the vehicle (e.g., change lanes or turn left) by operating the steering wheel, the driver first sees the rear-view mirror to check whether a following car is also going to change lanes, and then sees a side-view mirror to check whether any approaching moving object (e.g., a vehicle or a motorcycle) is present on the side to which the vehicle is changing the direction. The side-view mirror includes an optical mirror or an electronic mirror.

At this time, with the side-view mirror or the rear-view mirror, the driver is unable to sufficiently check the moving object running on the side to which the vehicle is changing the direction if the moving object is present in a blind spot. It is known that the blind spot is present on the sides or rear sides of the vehicle.

Thus, for example, Japanese Unexamined Patent Application Publication (JP-A) No. 2018-92291 discloses a technique of detecting a running environment around the vehicle by using a surrounding environment detector, such as a rear camera or a rear radar, mounted on the vehicle and constantly displaying whether the vehicle is allowed to change lanes on a display.

SUMMARY

An aspect of the disclosure provides a vehicle blind-spot reduction device to be applied to a vehicle. The vehicle blind-spot reduction device includes side-view mirrors, an actuator, a detector, a surrounding environment information acquirer, a moving object detector, a blind spot setter, and a display surface adjuster. The side-view mirrors are provided on both sides of the vehicle. The actuator is configured to move an optical display of each of the side-view mirrors. The detector is configured to detect a display position of the optical display. The surrounding environment information acquirer is configured to acquire environment information on surroundings of the vehicle. The moving object detector is configured to detect a moving object that is running beside the vehicle on a basis of the surrounding environment information acquired by the surrounding environment information acquirer. The blind spot setter is configured to set a blind spot of each of the side-view mirrors on a basis of the display position of the optical display detected by the detector. Based on determining that the moving object detected by the moving object detector has entered the blind spot set by the blind spot setter, the display surface adjuster causes the actuator to operate to adjust the display position of the optical display such that a driver who drives the vehicle is able to see the moving object.

An aspect of the disclosure provides a vehicle blind-spot reduction device to be applied to a vehicle. The vehicle blind-spot reduction device includes side-view mirrors, an actuator, a detector, a surrounding environment information acquirer, and circuitry. The side-view mirrors are provided on both sides of the vehicle. The actuator is configured to move an optical display of each of the side-view mirrors. The circuitry is configured to acquire a display position of the optical display. The circuitry is configured to acquire environment information on surroundings of the vehicle. The circuitry is configured to detect a moving object that is running beside the vehicle on a basis of the environment information. The circuitry is configured to set a blind spot of each of the side-view mirrors on a basis of the display position of the optical display. Based on determining that the detected moving object has entered the set blind spot, the circuitry is configured to cause the actuator to operate and adjust the display position of the optical display such that a driver who drives the vehicle is able to see the moving object.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

With the technique disclosed in JP-A No. 2018-92291, for example, the driver is able to know that changing lanes is not allowed by seeing the display, but may be unable to know whether changing lanes is allowed by seeing a side-view mirror or the rear-view mirror when changing the direction.

That is, if a moving object detected by the surrounding environment detector is running in a blind spot, the driver is unable to judge whether the moving object is actually present on the side to which the vehicle is changing the direction or whether the detection by the surrounding environment detector is misdetection. Thus, the driver may feel unsecured.

The same applies to autonomous driving. If the vehicle decelerates greatly when changing the direction and the driver is unable to see the moving object, the driver is unable to know why the vehicle decelerates and may feel unsecured.

It is desirable to provide a vehicle blind-spot reduction device that can prevent the driver from feeling unsecured by being unable to see a moving object if the surrounding environment detector mounted on the vehicle detects the moving object that is present in a blind spot of the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
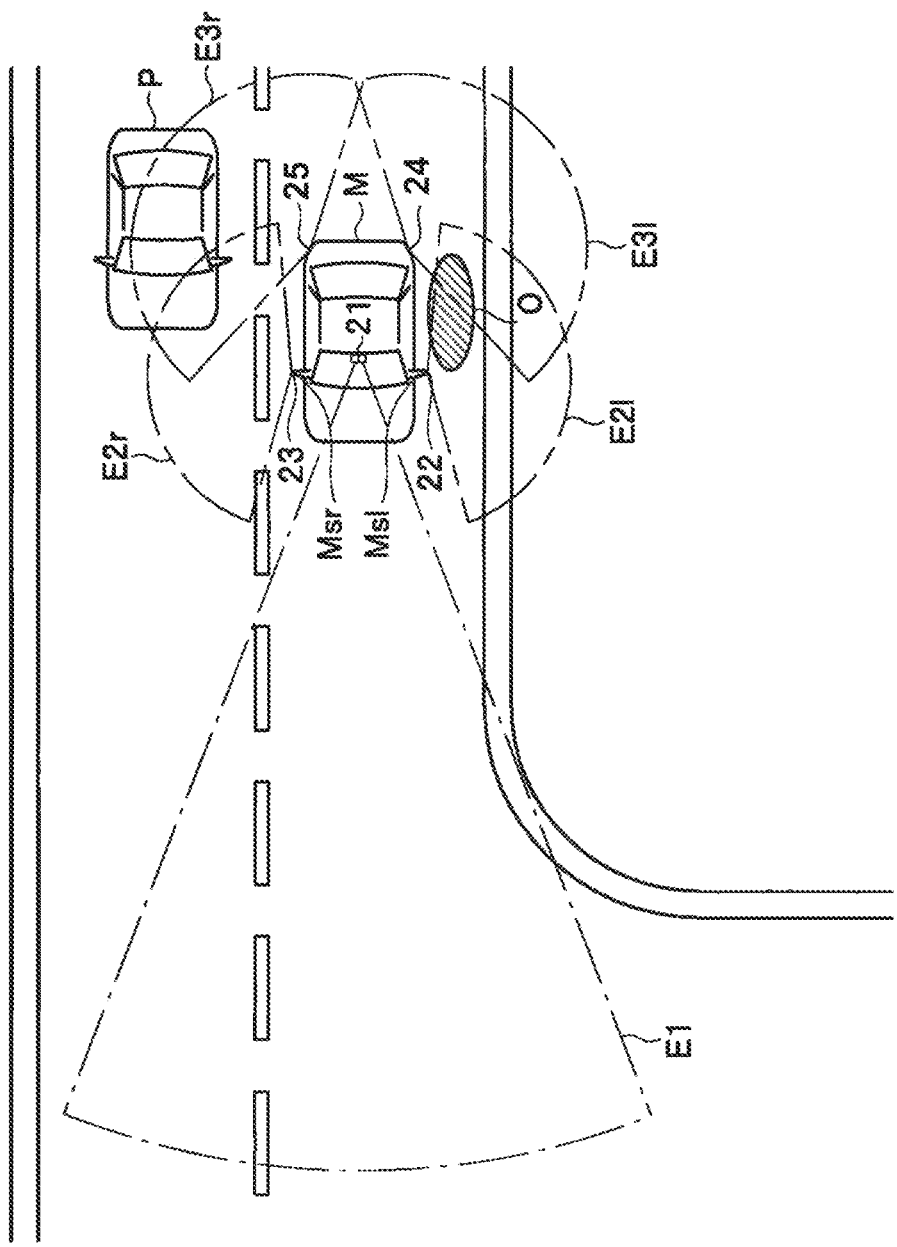
FIG. 1 illustrates regions detected by a surrounding environment detector mounted on a vehicle.

FIG. 1 illustrates a vehicle M, a parallel running vehicle P as a moving object running on an adjacent lane, such as a vehicle or a motorcycle, and a passing vehicle O as a moving object passing past the vehicle M on the same lane, such as a motorcycle or a bicycle. Note that the embodiment will be described on the assumption of left-hand traffic. Thus, the left and right in the following description are reversed for right-hand traffic.

Side-view mirrors Msl and Msr are disposed on left and right front doors of the vehicle M, and a rear-view mirror Mr (see FIG. 2) is disposed in the cabin. Each of the mirrors Msl, Msr, and Mr is an optical mirror provided with an angle adjusting mechanism that adjusts the angle of the mirror surface as an optical display. By the angle adjusting mechanism being electrically operated, the angle for determining the display position (reflection direction) of the mirror surface is adjusted. Furthermore, a monitoring camera Mc of a driver monitor system (DMS) is provided forward of the driver's seat in the cabin. The DMS monitors the driver's state from images captured by the monitoring camera Mc and determines the possibility that the driver is not looking ahead carefully.

Figure 4:
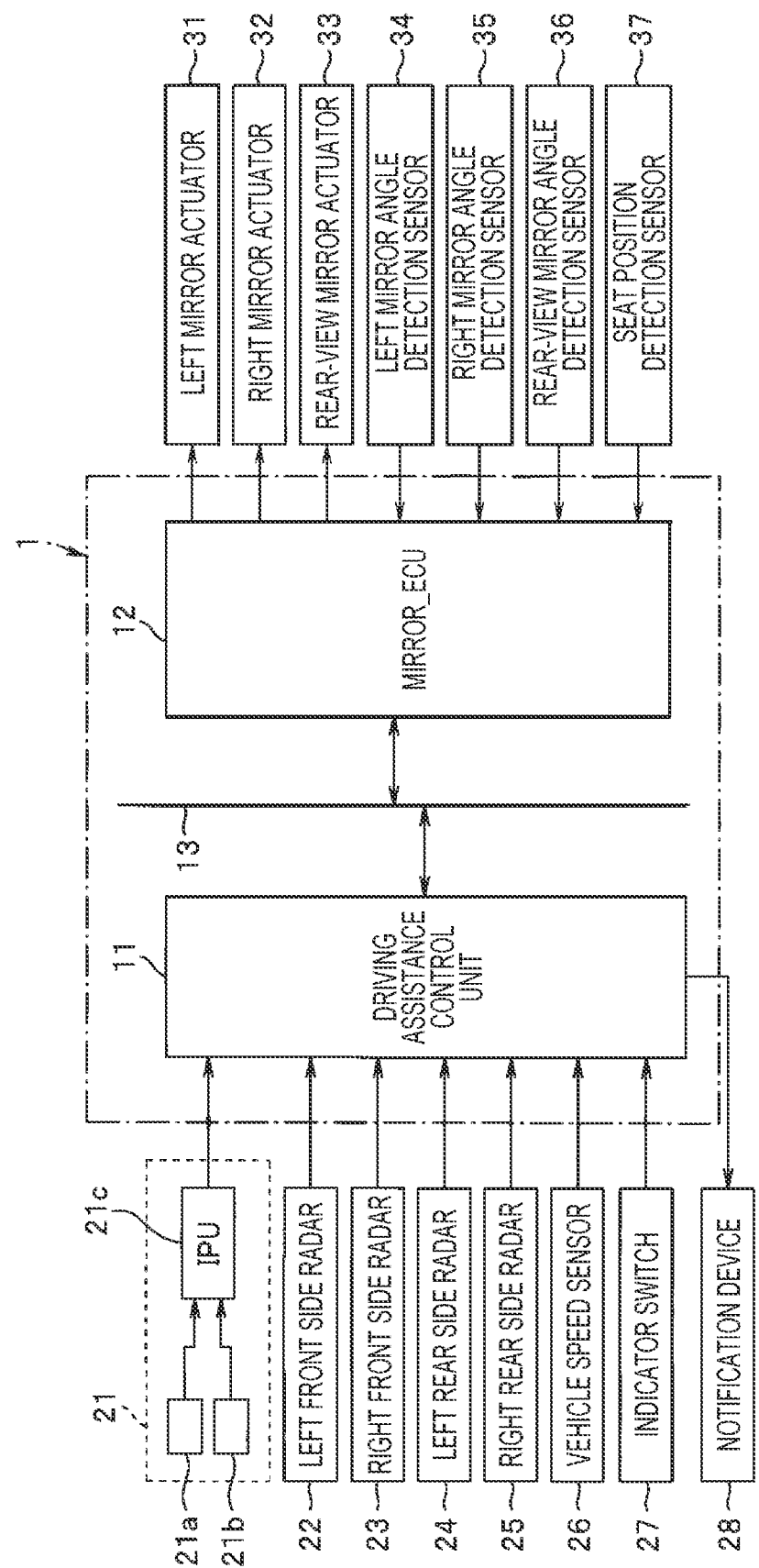
FIG. 4 schematically illustrates the configuration of a driving assistance device.

In addition, a driving assistance device 1 illustrated in FIG. 4 is mounted on the vehicle M. The driving assistance device 1 includes control units such as a driving assistance control unit 11 and a mirror control unit (mirror electronic control unit (mirror_ECU)) 12 that are coupled via an in-vehicle communication line 13 such as a controller area network (CAN) so that mutual communication is possible. Note that each of the control units 11 and 12 includes a known microcomputer including a central processing unit (CPU), a read-only memory (ROM), and a random access memory (RAM) and peripherals, and the ROM stores a control program, fixed data, or the like for implementing an operation that is set for each system.

The driving assistance control unit 11 has an input side to which an onboard camera unit 21, left and right front side radars 22 and 23, left and right rear side radars 24 and 25, a vehicle speed sensor 26 that detects a vehicle speed Vs of the vehicle M, an indicator switch (turn signal switch) 27 that causes an indicator in the changing direction to blink, or the like is coupled.

The driving assistance control unit 11 has an output side to which a notification device 28 is coupled. The onboard camera unit 21, the front side radars 22 and 23, and the rear side radars 24 and 25 acquire surrounding environment information of the vehicle M. In one embodiment, the onboard camera unit 21, the front side radars 22 and 23, and the rear side radars 24 and 25 may serve as a "surrounding environment information acquirer". In addition, the indicator switch 27 is a general term for a left indicator switch and a right indicator switch.

The onboard camera unit 21 includes a stereo camera including a main camera 21a and a sub-camera 21b and an image processing unit (IPU) 21c. The main camera 21a and the sub-camera 21b are disposed to be symmetrical with respect to the center of the vehicle-width direction above the rear-view mirror Mr and capture running environment images in a predetermined imaging region E1 (see FIG. 1) forward of the vehicle M. The running environment images are subjected to predetermined image processing performed by the IPU 21c and are then transmitted to the driving assistance control unit 11.

In addition, each of the radars 22 to 25 is a millimeter-wave radar, a microwave radar, Light Detection and Ranging (LiDAR), or the like. For example, the left and right front side radars 22 and 23 are disposed at ends of the left and right side-view mirrors Msl and Msr. On the other hand, for example, the left and right rear side radars 24 and 25 are disposed at left and right ends of a rear bumper.

The front side radars 22 and 23 scan regions E2*l* and E2*r* (see FIG. 1) from the left and right oblique fronts to the sides of the vehicle M. On the other hand, the rear side radars 24 and 25 scan regions E3*l* and E3*r* (see FIG. 1) from the rear to left and right regions of the vehicle M that the front side radars 22 and 23 are incapable of scanning.

On the basis of image information from the IPU 21c, the driving assistance control unit 11 acquires information indicating whether a preceding vehicle as a target to follow or whether a forward obstacle is present, a lane marker that marks each lane, a lane on which the vehicle M is running, and road shape information (e.g., a straight road or a curvy road) from the curvature of the lane marker. On the basis of such information, the driving assistance control unit 11 performs known driving assistance typified by adaptive cruise control (ACC) or active lane keep (ALK) and autonomous driving.

Furthermore, on the basis of scan data from the radars 22 to 25, the driving assistance control unit 11 detects the parallel running vehicle P approaching the vehicle M or the passing vehicle O, such as a motorcycle or a bicycle, and also obtains the distance from the vehicle M to the parallel running vehicle P or the passing vehicle O, the direction of the parallel running vehicle P or the passing vehicle O from the vehicle M, and the relative vehicle speed of the vehicle M and the parallel running vehicle P or the passing vehicle O. If it is determined that the detected passing vehicle O approaches the vehicle M, the notification device 28 is operated to warn the driver.

In addition, on the basis of a command signal from the driving assistance control unit 11, the notification device 28 visually (by monitor display or lighting a lamp) or audibly (by a buzzer sound or speech) notifies the driver of the presence of the approaching passing vehicle O and the start, stop, or end of driving assistance control.

On the other hand, the mirror_ECU 12 has an output side to which left and right mirror actuators 31 and 32 and a rear-view mirror actuator 33 are coupled. The left and right mirror actuators 31 and 32 serve as actuators that operate the angle adjusting mechanisms provided for the left and right side-view mirrors Msl and Msr. The rear-view mirror actuator 33 operates the angle adjusting mechanism provided for the rear-view mirror Mr.

The mirror_ECU 12 has an input side to which left and right mirror angle detection sensors 34 and 35, a rear-view mirror angle detection sensor 36, and a seat position detection sensor 37 are coupled. The left and right mirror angle detection sensors 34 and 35 detect the angles of mirror surfaces of the left and right side-view mirrors Msl and Msr. The rear-view mirror angle detection sensor 36 detects the angle of the mirror surface of the rear-view mirror Mr. In one embodiment, the seat position detection sensor 37 may serve as a "seat position detector". Each of the mirror angle detection sensors 34 to 36 as a detector detects, for example, the angle that is the inclination of the mirror surface on the basis of the operation angle of the angle adjusting mechanism.

The seat position detection sensor 37 detects the driver's seat position and is, for example, a seat sensor that detects the position of a seat cushion of the driver's seat Ds in the front-back direction. Alternatively, the monitoring camera Mc included in the driver monitor system (DMS) may be used as the seat position detection sensor 37. In this case, on the basis of images captured by the monitoring camera Mc, the mirror_ECU 12 obtains the face position (including the height direction) of a driver D in the cabin and sets the position as the seat position.

Figure 2:
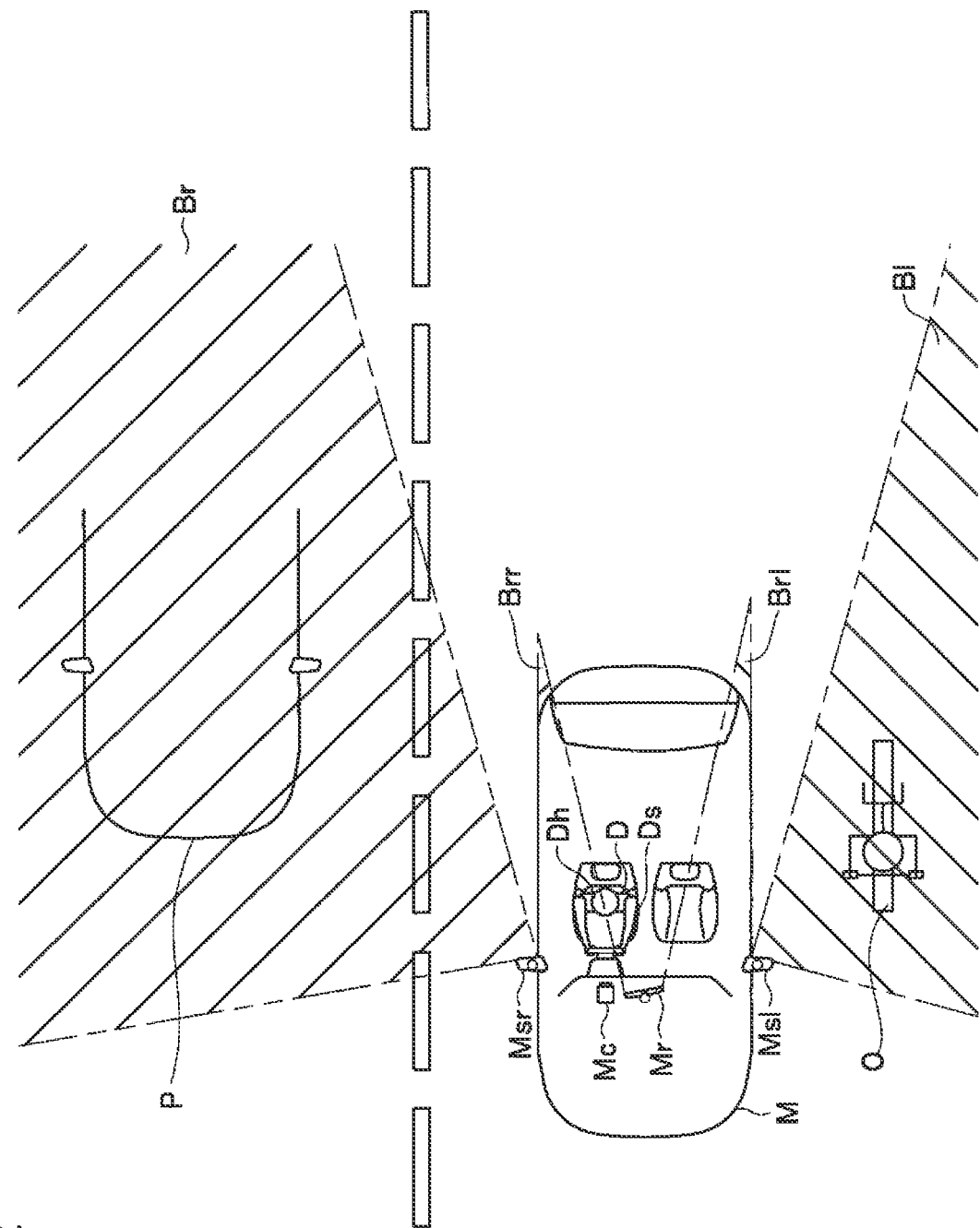
FIG. 2 illustrates left and right side blind spots generated when the vehicle is running on a left lane.
Figure 3:
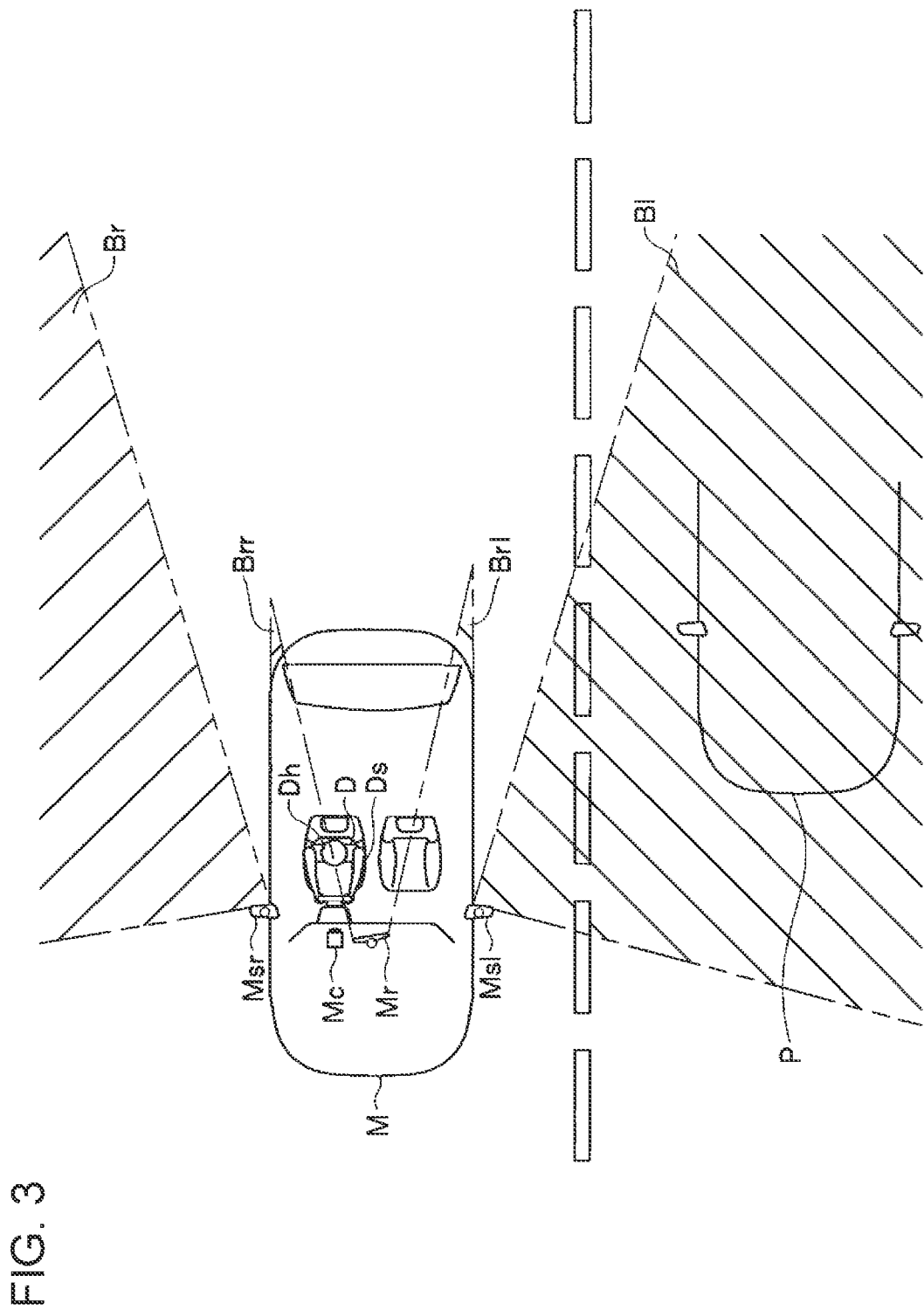
FIG. 3 illustrates a side blind spot on the left lane generated when the vehicle is running on a right lane.

As illustrated in FIGS. 2 and 3, there are blind spots (side blind spots) Bl and Br on both sides of the vehicle M. It is difficult for the driver D to see the side blind spots Bl and Br in the left and right side-view mirrors Msl and Msr. Similarly, there are blind spots (rear blind spots) Brl and Brr on the rear left and right of the vehicle M. It is difficult for the driver D to see the rear blind spots Brl and Brr in the rear-view mirror Mr. In one example, the side blind spots Bl and Br on both sides of the vehicle M include information that is to be used when the driver D changes the direction. Thus, the side blind spots Bl and Br are desirably as narrow as possible.

When the driver D is going to change the direction, the mirror_ECU 12 examines whether the parallel running vehicle P or the passing vehicle O is present in the side blind spots Bl and Br, and, if the parallel running vehicle P or the passing vehicle O is detected, the mirror_ECU 12 adjusts the angles of the mirror surfaces of the left and right side-view mirrors Msl and Msr such that the driver D is able to see the parallel running vehicle P or the passing vehicle O.

Figure 10:
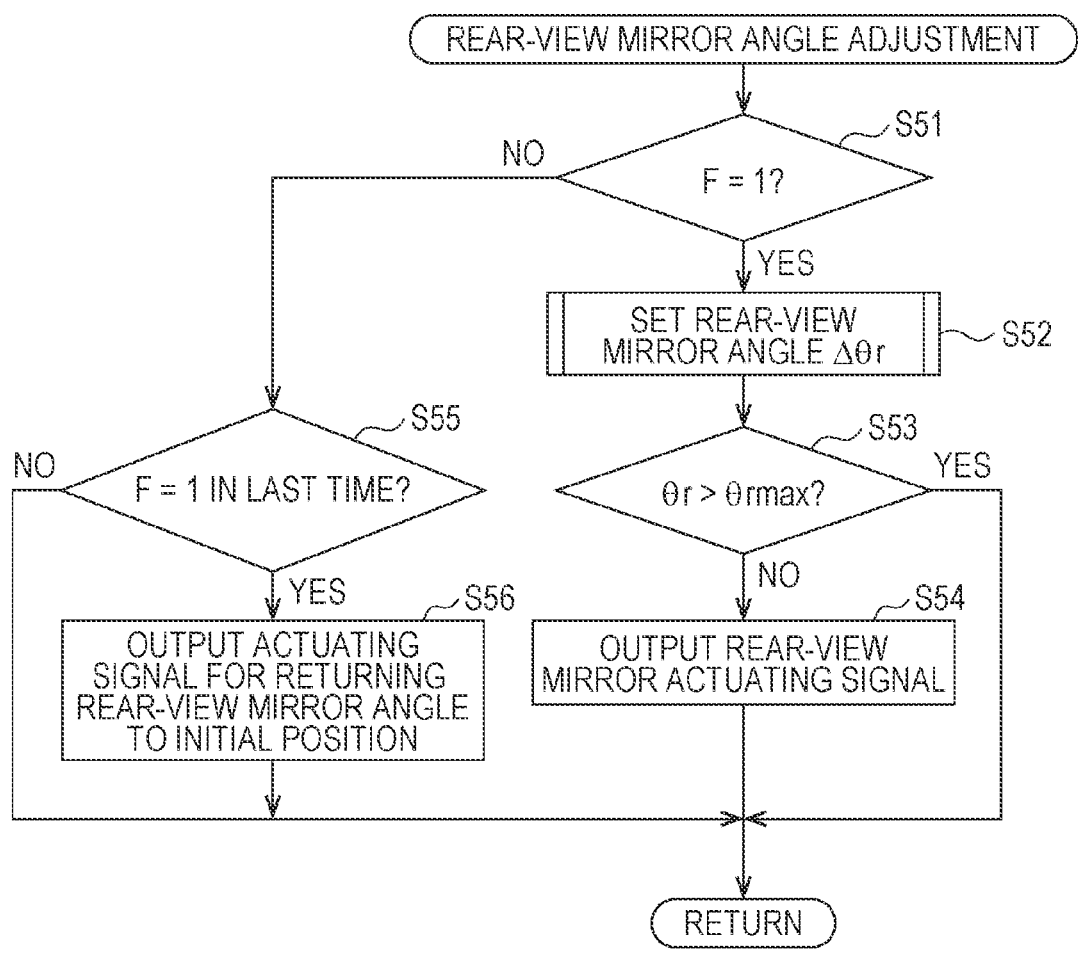
FIG. 10 is a flowchart illustrating a rear-view mirror angle adjustment routine.

In one example, the angles of the mirror surfaces are adjusted by the mirror_ECU 12 in accordance with a mirror angle adjustment routine illustrated in FIGS. 6 to 9 and a rear-view mirror angle adjustment routine illustrated in FIG. 10 every predetermined calculation cycle.

Figure 5:
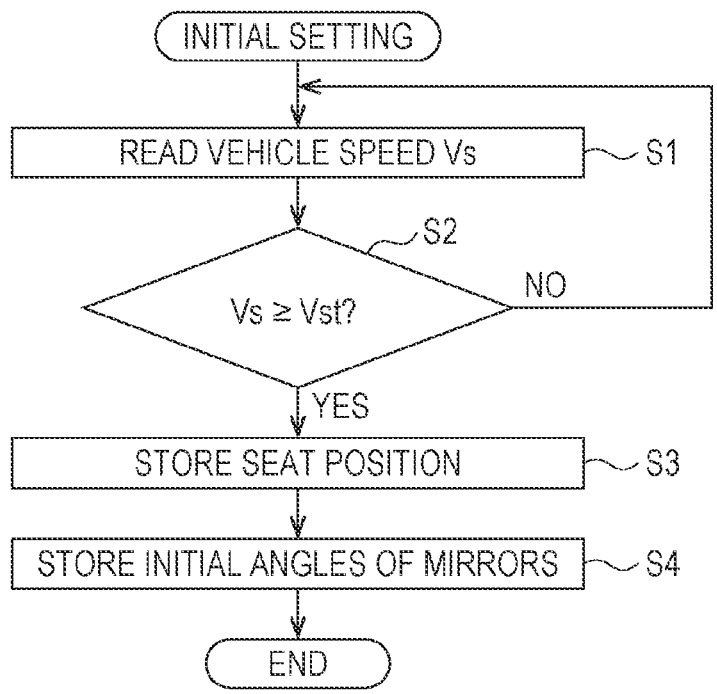
FIG. 5 is a flowchart illustrating an initial setting routine.
Figure 6:
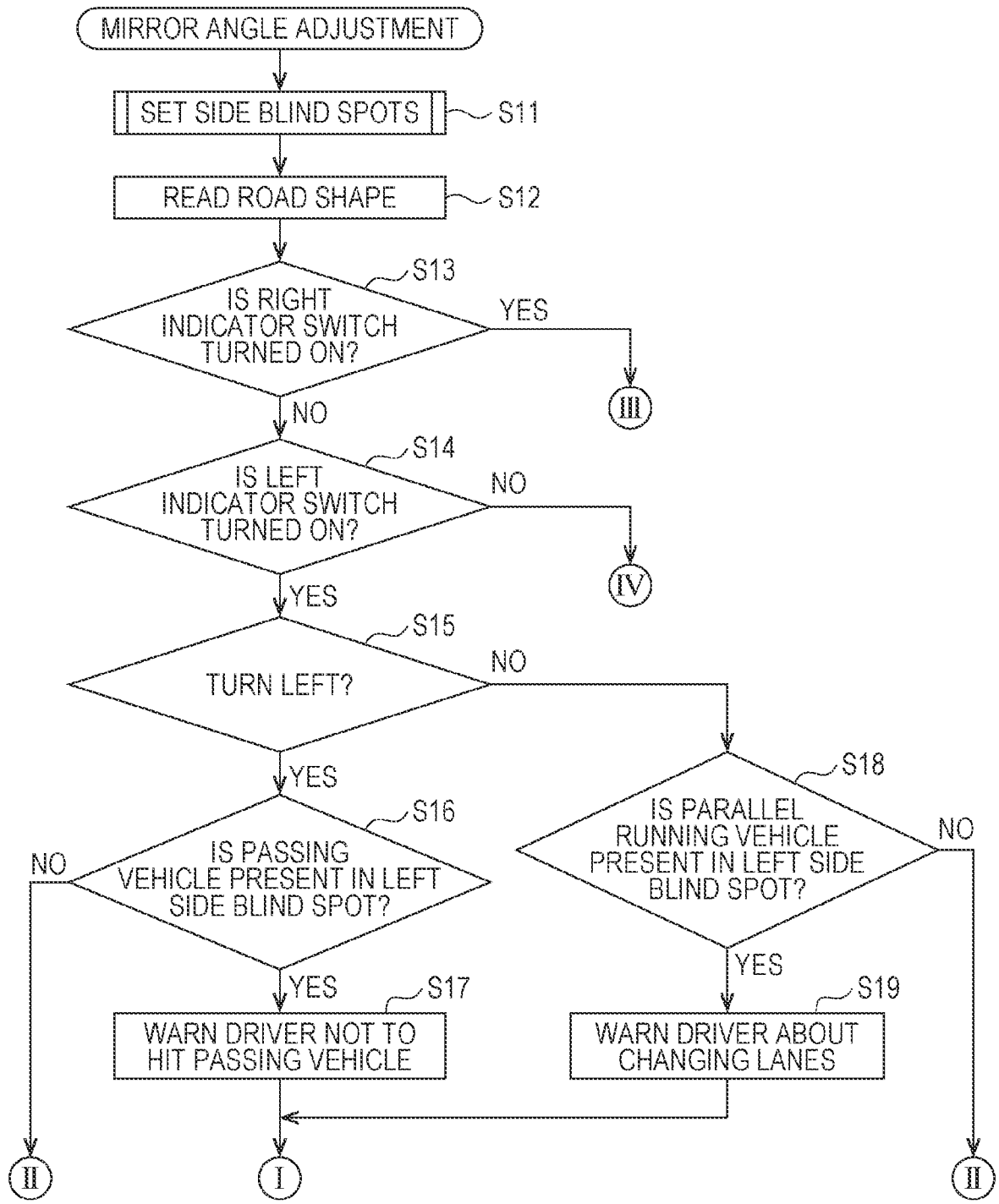
FIG. 6 is a flowchart illustrating a mirror angle adjustment routine (first part)
Figure 7:
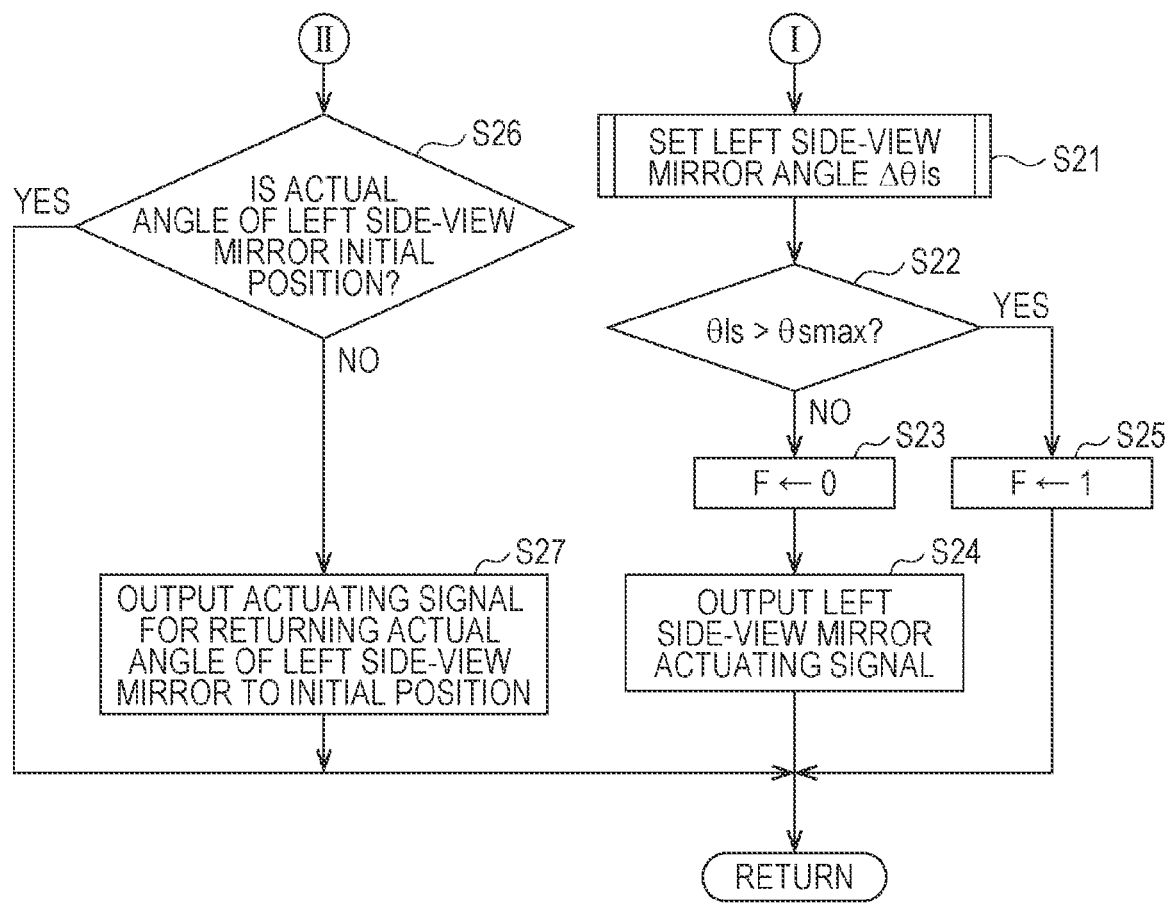
FIG. 7 is a flowchart illustrating the mirror angle adjustment routine (second part)
Figure 8:
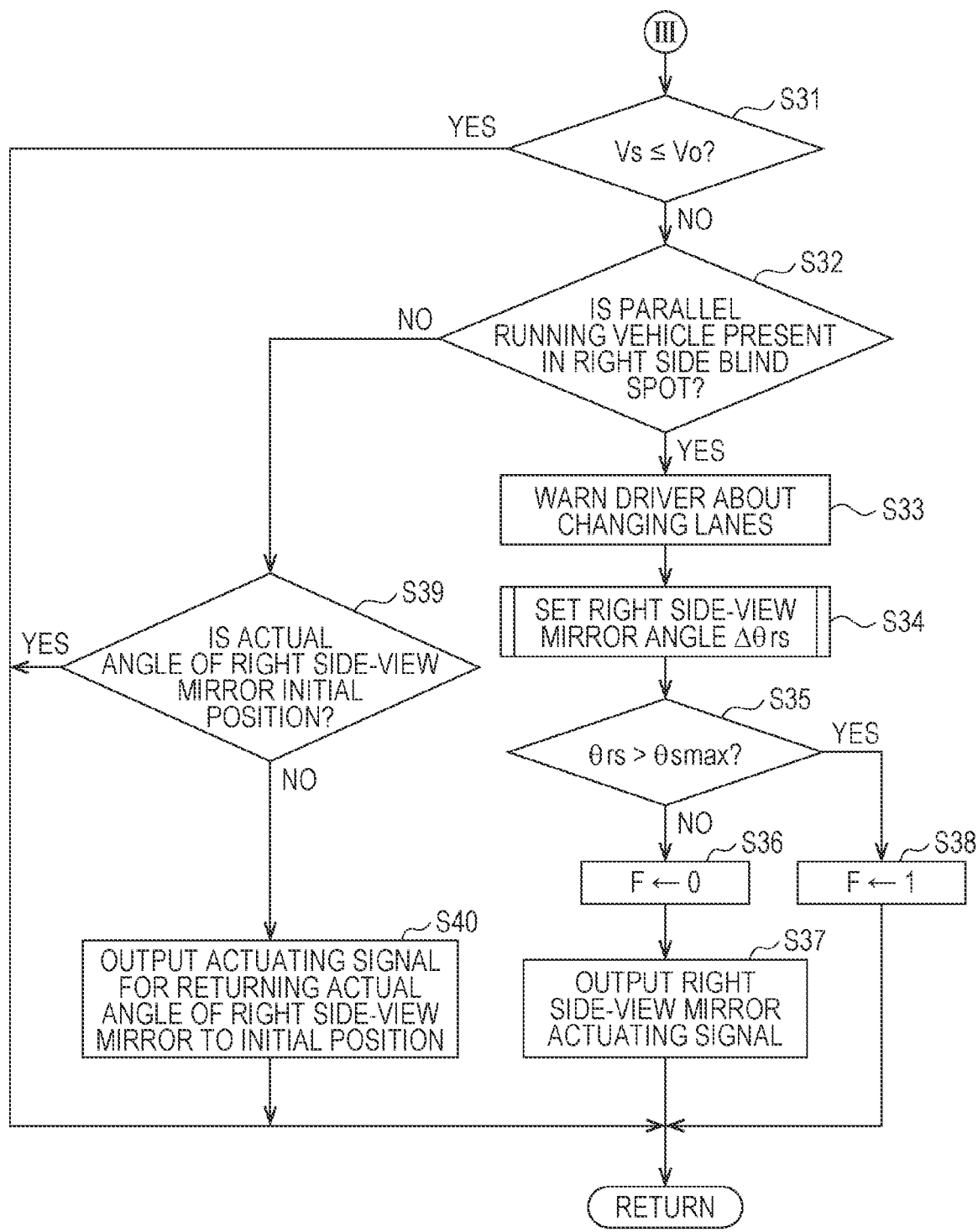
FIG. 8 is a flowchart illustrating the mirror angle adjustment routine (third part)
Figure 9:
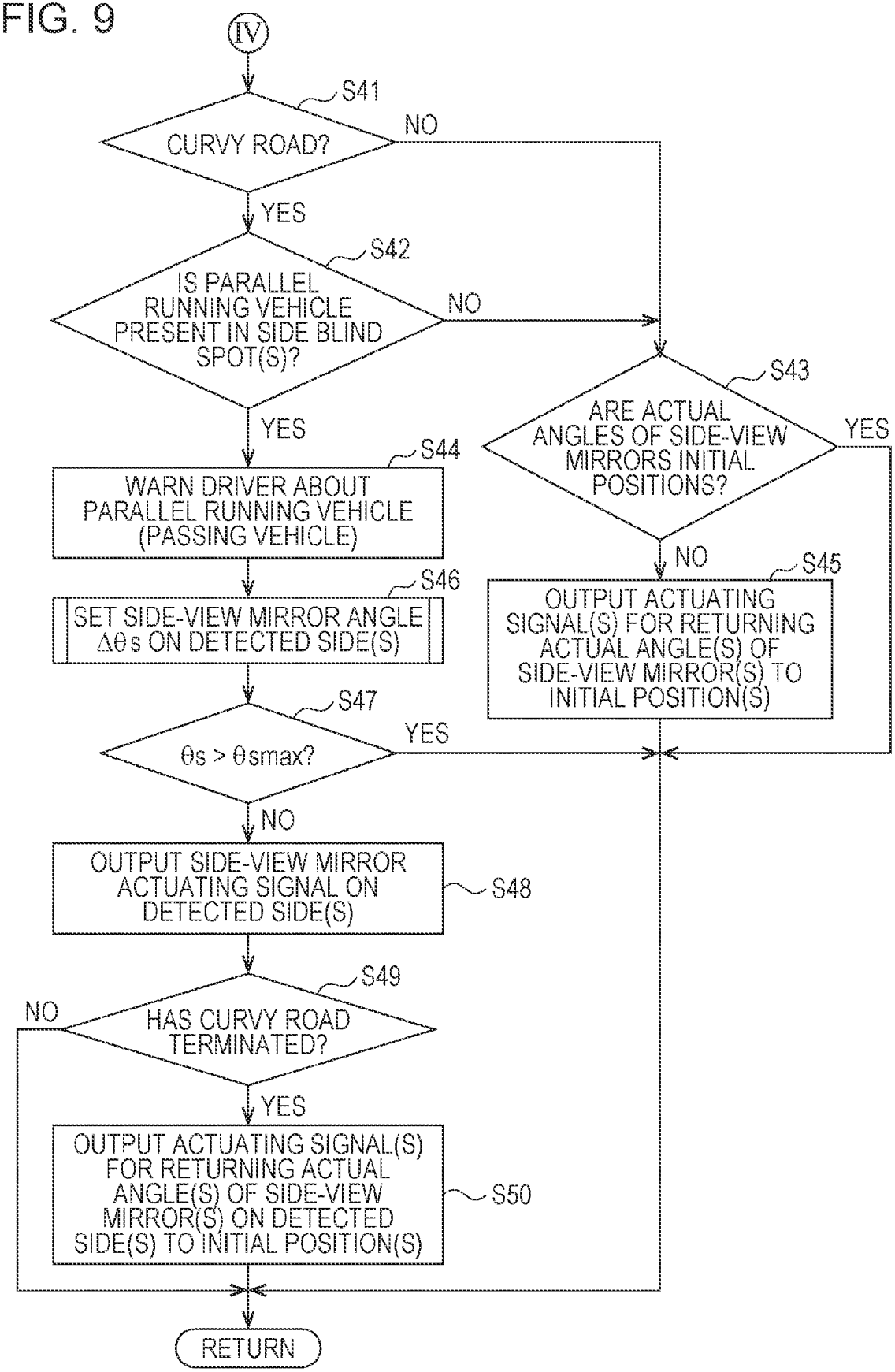
FIG. 9 is a flowchart illustrating the mirror angle adjustment routine (fourth part)

Prior to execution of the routine, each time the driving assistance device 1 is started, an initial setting routine illustrated in FIG. 5 is executed once.

That is, upon the driving assistance device 1 being started, first, in step S1 in the initial setting routine, the vehicle speed Vs detected by the vehicle speed sensor 26 is read, and in step S2, the vehicle speed Vs and a start determination vehicle speed Vst (e.g., 10 to 15 km/h) are compared with each other, and the driving assistance device 1 waits for the vehicle M to start. Upon starting being detected (Vs≥Vst), the routine advances to step S3.

In step S3, the seat position of the driver D detected by the seat position detection sensor 37 is stored, and in the following step S4, the angles of the mirror surfaces of the left and right side-view mirrors Msl and Msr and the rear-view mirror Mr, detected by the mirror angle detection sensors 34 to 36, respectively, are stored as initial angles, and the routine ends. Note that, in this embodiment, an intermediate value of a maximum range in which the mirror surface can rotate to the left and right is set as a reference angle 0°, and the directional angle of the mirror surface toward the vehicle body direction is set as a negative angle (−), and the directional angle of the mirror surface toward the outside is set as a positive angle (+). The initial angle is an angle based on the reference angle 0°.

Subsequently, the routine illustrated in FIGS. 6 to 9 is executed. In step S11, the side blind spots Bl and Br are approximately set. It is difficult for the driver D to see the side blind spots Bl and Br in the left and right side-view mirrors Msl and Msr. In one embodiment, the processing in step S11 may serve as processing executed by a "blind spot setter".

That is, in step S11, first, the seat position of the driver D and the initial angles of the mirror surfaces of the left and right side-view mirrors Msl and Msr, which are stored in the initial setting, are read. Subsequently, on the basis of the seat position of the driver D, a standard position of a head Dh is estimated. On the basis of the position of the head Dh of the driver D and the initial angles of the mirror surfaces, regions that the driver D is able to see in the left and right side-view mirrors Msl and Msr are estimated. Furthermore, regions that the driver D is able to see directly when turning to the directions of the left and right side-view mirrors Msl and Msr are estimated. The spot between the region that the driver D is able to see in the side-view mirror Msl and the region that the driver D is able to see directly is set as a side blind spot Bl. The spot between the region that the driver D is able to see in the side-view mirror Msr and the region that the driver D is able to see directly is set as a side blind spot Br.

In the following step S12, the driving assistance control unit 11 reads road shape information that is acquired on the basis of image information transmitted from the IPU 21c of the onboard camera unit 21. In one embodiment, the processing in this step may serve as processing executed by a "road shape acquirer".

In the following steps S13 and S14, on the basis of whether any of the left indicator switch and the right indicator switch is turned on, which are collectively referred to as the indicator switch 27, it is determined whether the vehicle M is going to change the direction. Note that the direction may be changed automatically by the driving assistance control unit 11 or manually by the driver D operating the steering wheel.

If the indicator switch 27 is not turned on, it is determined that the vehicle M is not going to change the direction (turn left, turn right, change lanes), and the routine jumps to step S41.

If the left indicator switch is turned on, it is determined that the vehicle M is going to change the direction to the left, and the routine advances to step S15. On the other hand, if the right indicator switch is turned on, it is determined that the vehicle M is going to change the direction to the right, and the routine advances to step S31.

In step S15, it is determined whether the vehicle M is going to turn left or to change lanes. It is determined whether changing the direction is turning left or changing lanes on the basis of, for example, image information transmitted from the IPU 21c of the onboard camera unit 21. That is, on the basis of the image information, the lane on which the vehicle M is running is detected, and, if the vehicle M is running on a first lane (left lane), it is determined that the vehicle M is going to turn left. In addition, if the vehicle M is running on a lane other than the first lane (e.g., a second lane or a third lane), it is determined that the vehicle M is going to change lanes.

In this case, whether the vehicle M is going to turn left or change lanes may be determined by comparing the vehicle speed Vs and a preset decelerated vehicle speed for turning left with each other, and, if the vehicle speed Vs is less than or equal to the decelerated vehicle speed, it may be determined that the vehicle M is going to turn left. Alternatively, whether the vehicle M is going to turn left or change lanes may be determined on the basis of road map information and the location information of the vehicle M. Further alternatively, whether the vehicle M is going to turn left or change lanes may be determined on the basis of a preset target route if the driving assistance control unit 11 causes the vehicle M to run by autonomous driving. In one embodiment, the processing in steps S13 to S15 may serve as processing executed by an "operation detector".

If it is determined that the vehicle M is going to turn left, the routine advances to step S16. If it is determined that the vehicle M is going to change lanes, the routine advances to step S18.

In step S16, it is determined whether the passing vehicle O is detected in the left side blind spot Bl. That is, on the basis of scan data from the left front side radar 22 and the left rear side radar 24, the mirror_ECU 12 determines whether the driving assistance control unit 11 has detected the passing vehicle O and also determines whether the passing vehicle O has entered the left side blind spot Bl. In one embodiment, the processing in steps S16 and steps S18, S32, and S42 that are described later may serve as processing executed by a "moving object detector".

If it is determined that there is no passing vehicle O, the routine advances to step S26. Alternatively, if the passing vehicle O has not entered the left side blind spot Bl although the passing vehicle O is present, it is determined that the driver D is able to see the passing vehicle O, and the routine advances to step S26. Whether the passing vehicle O has entered the left side blind spot Bl is determined by determining whether the passing vehicle O overlaps with the left side blind spot Bl on the basis of the distance from the vehicle M to the passing vehicle O and the direction of the passing vehicle O from the vehicle M.

If it is determined that the passing vehicle O has entered the left side blind spot Bl as illustrated in FIG. 2, the routine advances to step S17. In this state, since the driver D may be unable to see the passing vehicle O, the notification device 28 notifies the driver D of a warning indicating, "do not hit passing vehicle", and the routine advances to step S21. Note that the detection limits in the lateral direction (the width direction of the vehicle M) to be set for the left side blind spot Bl are ends of the regions E2l and E2r to be scanned by the radars 22 and 24.

On the other hand, if the routine advances to step S18 as a result of the determination that the vehicle M is going to change lanes, it is determined whether the parallel running vehicle P has entered the left side blind spot Bl. That is, on the basis of scan data from the right front side radar 23 and the right rear side radar 25, the mirror_ECU 12 determines whether the driving assistance control unit 11 has detected the parallel running vehicle P and also determines whether the parallel running vehicle P has entered the right side blind spot Br.

If it is determined that there is no parallel running vehicle P, the routine advances to step S26. Alternatively, if the parallel running vehicle P has not entered the right side blind spot Br although the parallel running vehicle P is present, it is determined that the driver D is able to see the parallel running vehicle P, and the routine advances to step S26. Whether the parallel running vehicle P has entered the right side blind spot Br is determined by determining whether the parallel running vehicle P overlaps with the right side blind spot Br on the basis of the distance from the vehicle M to the parallel running vehicle P and the direction of the parallel running vehicle P from the vehicle M. Note that the determination as to whether the parallel running vehicle P has entered the left side blind spot Bl is the same as the above-described determination for the passing vehicle O, and thus, the description thereof is omitted.

If it is determined that the parallel running vehicle P has entered the left side blind spot Bl as illustrated in FIG. 3, the driver D may be unable to see the parallel running vehicle P. Thus, the routine advances to step S19. In step S19, the notification device 28 notifies the driver D of a warning indicating "watch out for changing lanes", and the routine advances to step S21. If the routine advances to step S21 from step S17 or S19, a left side-view mirror control angle (hereinafter referred to as "left mirror angle") $\Delta\theta ls$ is set, and the routine advances to step S22. By the left mirror angle $\Delta\theta ls$, the mirror surface provided for the left side-view mirror Msl is rotated to a position where the driver D is able to see the passing vehicle O or the parallel running vehicle P. In one embodiment, the processing in steps S21 and also steps S34 and S46 described later may serve as processing executed by a "display surface adjuster".

Figure 11:
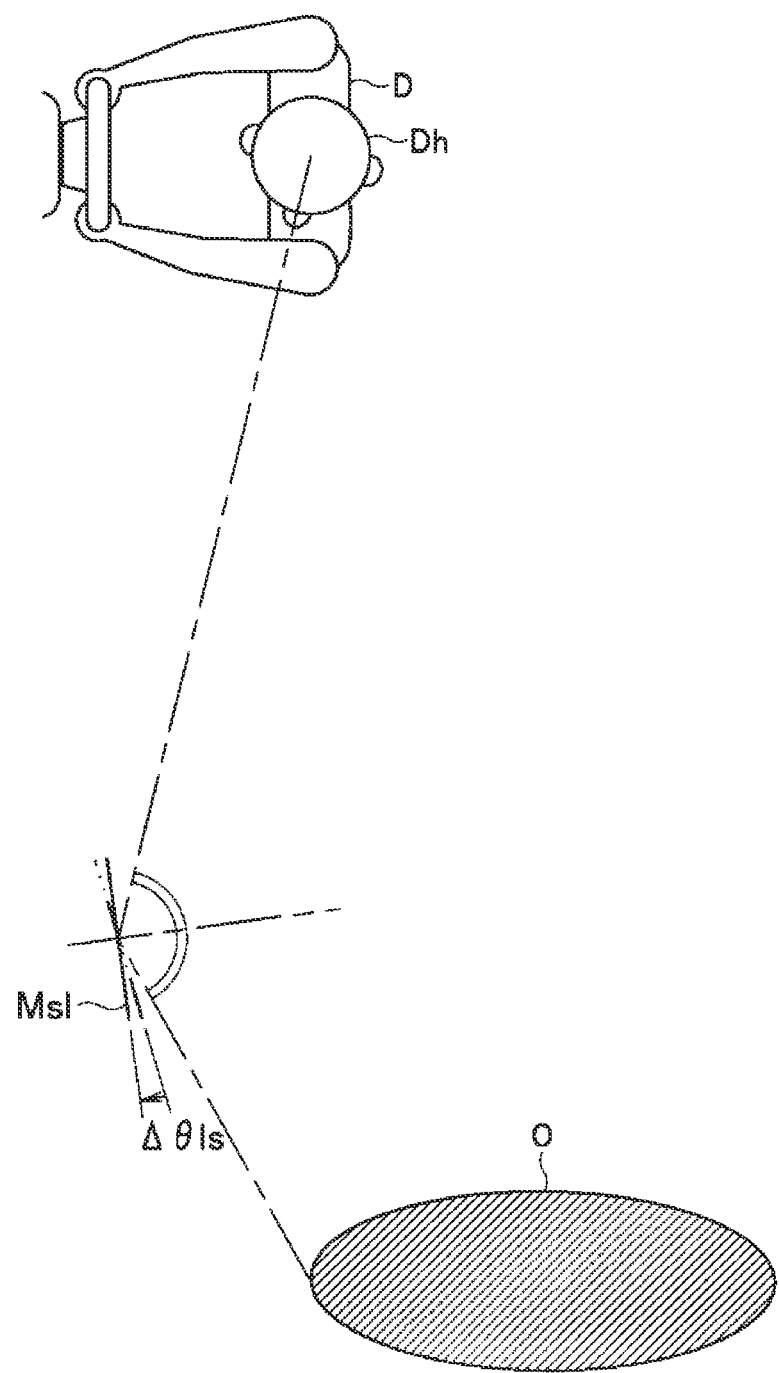
FIG. 11 schematically illustrates a case in which a moving object entering a left side blind spot is reflected on a side-view mirror.

As illustrated in FIG. 11, to obtain the left mirror angle $\Delta\theta ls$, first, an actual angle $\theta ls$ from the reference angle 0° is obtained. At the actual angle $\theta ls$, the direction of the head Dh of the driver D and the direction of the passing vehicle O have an equal incident angle relative to the mirror surface of the left side-view mirror Msl. A difference between the actual angle $\theta ls$ and an actual angle $\theta ls$ obtained at the last calculation (or the initial angle for the initial calculation) is set as the left mirror angle $\Delta\theta ls$. Thus, the left mirror angle $\Delta\theta ls$ continuously changes depending on the relative position between the vehicle M and the passing vehicle O or the parallel running vehicle P. This enables the driver D to clearly see the passing vehicle O (the parallel running vehicle P) on any type of road.

In step S22, the actual angle $\theta ls$ and a maximum allowable angle $\theta smax$ from the reference angle 0° of the mirror surface are compared with each other, and it is determined whether the actual angle $\theta ls$ exceeds the maximum allowable angle $\theta smax$. If $\theta ls \leq \theta smax$, the actual angle $\theta ls$ is within the movable range of the mirror surface, and thus, the routine advances to step S23. In step S23, a mirror angle movement flag F is cleared (F←0), and the routine advances to step S24. If $\theta ls > \theta smax$, the actual angle $\theta ls$ is beyond the movable range of the mirror surface, and thus, the routine advances to step S25. In step S25, the mirror angle movement flag F is set (F←1), and the routine is returned.

In step S24, an actuating signal corresponding to the left mirror angle $\Delta\theta ls$ (left side-view mirror actuating signal) is output to the left mirror actuator 31, and the routine is returned.

In response to this, the angle adjusting mechanism provided for the left side-view mirror Msl is actuated, and the mirror surface is rotated by a predetermined angle. As illustrated in FIG. 11, if the vehicle M is going to turn left, at the position of line of sight for normal driving, the driver D can be made to see the passing vehicle O that has entered the left side blind spot Bl. Thus, the driver D manually driving the vehicle M can decelerate or stop the vehicle M to wait for the passing vehicle O or the parallel running vehicle P to pass by, thereby preventing hitting. In addition, if the driving assistance control unit 11 is autonomously driving the vehicle M, by using the left side-view mirror Msl, the driver D can easily know why the vehicle M decelerates or stops.

If the routine advances to step S26 from step S16 or S18, it is determined whether the actual angle θls detected by the left mirror angle detection sensor 34 is the initial angle. If the actual angle θls=the initial angle, the routine is returned. If the actual angle θls is not the initial angle, the routine advances to step S27. In step S27, an actuating signal for returning the angle of the mirror surface of the left side-view mirror Msl to the initial angle is output, and the routine is returned. Thus, if the passing vehicle O or the parallel running vehicle P departs from the left side blind spot Bl, the mirror surface of the left side-view mirror Msl automatically returns to the initial angle.

On the other hand, if it is determined in step S13 that the right indicator switch is turned on, and the routine advances to step S31, the vehicle speed Vs and a turning right determination vehicle speed Vo are compared with each other. The driver D turns on the right indicator switch when turning right in addition to changing lanes. To turn right, the vehicle speed Vs is decelerated greatly compared with a case of changing lanes. Thus, in this embodiment, the vehicle speed upper limit for turning right is obtained by experiment or the like in advance, and this limit is set as the turning right determination vehicle speed Vo.

If Vs≤Vo, it is determined that the vehicle M is going to turn right, and the routine is returned. At this time, for example, if a moving object, such as a pedestrian or a bicycle, which is going to cross a road on the turning-right direction is present, the moving object is detected by the onboard camera unit 21, and thus, the driving assistance control unit 11 performs processing.

If Vs>Vo, it is determined that the vehicle M is going to change lanes, and the routine advances to step S32. In step S32, it is determined whether the parallel running vehicle P has entered the right side blind spot Br. Whether the parallel running vehicle P has entered the right side blind spot Br is determined by determining whether the parallel running vehicle P overlaps with the right side blind spot Br on the basis of the distance from the vehicle M to the parallel running vehicle P and the direction of the parallel running vehicle P from the vehicle M. If it is determined that there is no parallel running vehicle P that has entered the right side blind spot Br, the routine advances to step S39.

If it is determined that the parallel running vehicle P has entered the right side blind spot Br as illustrated in FIG. 2, the driver D may be unable to see the parallel running vehicle P. Thus, the routine advances to step S33. In step S33, the notification device 28 notifies the driver D of a warning indicating, "watch out for changing lanes", and the routine advances to step S34. Note that the detection limits in the lateral direction (the width direction of the vehicle M) of the right side blind spot Br are ends of the regions E2r and E3r to be scanned by the radars 23 and 25.

Figure 12:
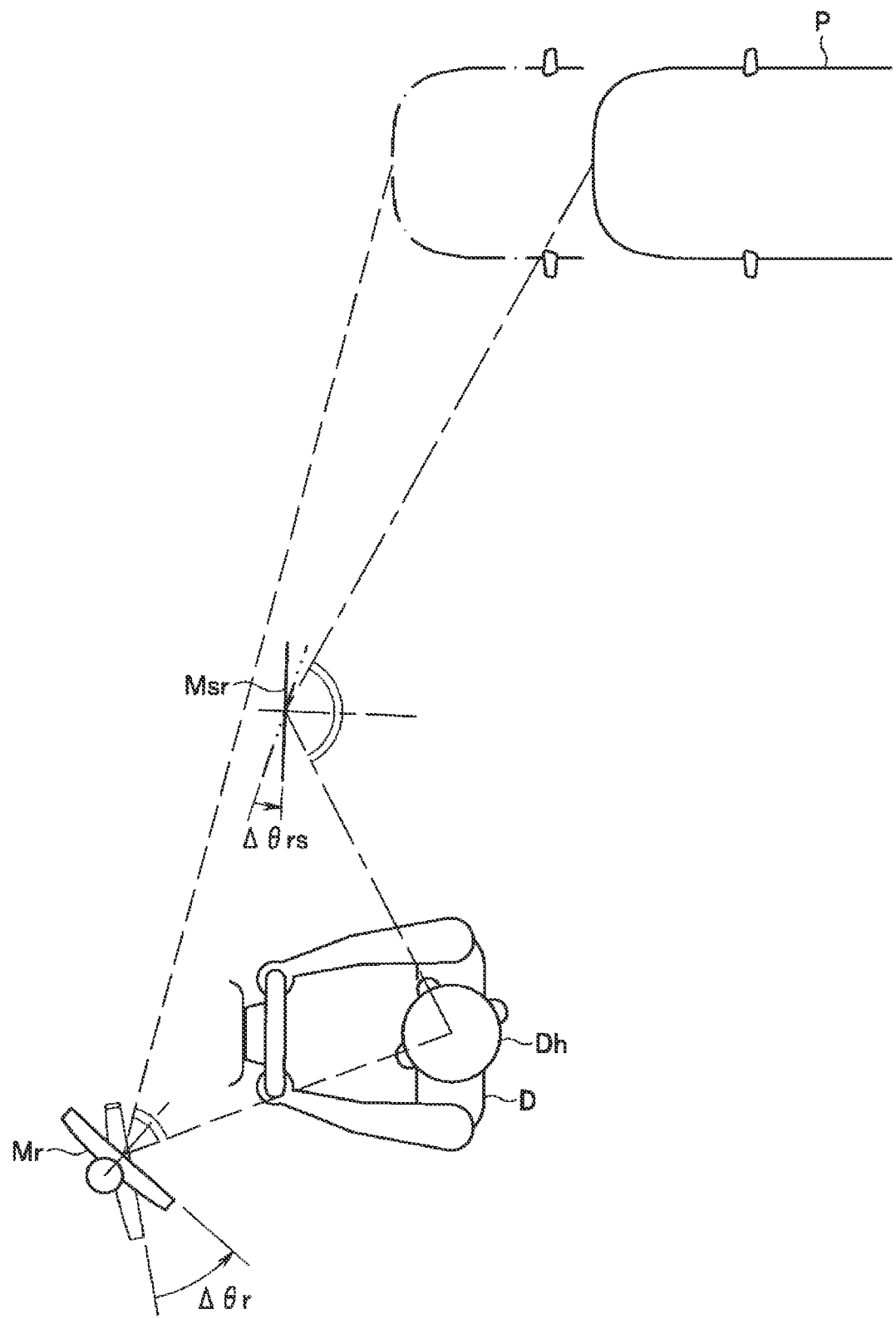
FIG. 12 schematically illustrates a case in which a parallel running vehicle entering a right side blind spot is reflected on a side-view mirror.

In step S34, a right side-view mirror control angle (hereinafter referred to as "right mirror angle") Δθrs is set, and the routine advances to step S35. By the right mirror angle Δθrs, the mirror surface provided for the right side-view mirror Msr is rotated to a position where the driver D is able to see the parallel running vehicle P. As illustrated in FIG. 12, to obtain the right mirror angle Δθrs, first, an actual angle θrs from the reference angle 0° is obtained. At the actual angle θrs, the direction of the head Dh of the driver D and the direction of the parallel running vehicle P have an equal incident angle relative to the mirror surface. A difference between the actual angle θrs and an actual angle θrs obtained at the last calculation (or the initial angle for the initial calculation) is set as the right mirror angle Δθrs. Thus, the right mirror angle Δθrs continuously changes depending on the relative position between the vehicle M and the parallel running vehicle P.

In the following step S35, the actual angle θrs and the maximum allowable angle θsmax from the reference angle 0° of the mirror surface are compared with each other, and it is determined whether the actual angle θrs exceeds the maximum allowable angle θsmax. If θrs ≤θsmax, the actual angle θrs is within the movable range of the mirror surface, and thus, the routine advances to step S36. In step S36, a mirror angle movement flag F is cleared (F←0), and the routine advances to step S37. If θrs>θsmax, the actual angle θrs is beyond the movable range of the mirror surface, and thus, the routine advances to step S38. In step S38, the mirror angle movement flag F is set (F←1), and the routine is returned.

In step S37, an actuating signal corresponding to the right mirror angle Δθrs (right side-view mirror actuating signal) is output to the right mirror actuator 32, and the routine is returned. In response to this, the angle adjusting mechanism provided for the right side-view mirror Msr is actuated, and the mirror surface is rotated by a predetermined angle. As illustrated in FIG. 12, this enables the driver D to clearly see the parallel running vehicle P that has entered the right side blind spot Br on any type of road, at the position of line of sight for normal driving.

On the other hand, if the routine advances to step S39 from step S32, it is determined whether the actual angle θrs detected by the right mirror angle detection sensor 35 is the initial angle. If the actual angle θrs=the initial angle, the routine is returned. If the actual angle θrs is not the initial angle, the routine advances to step S40. In step S40, an actuating signal for returning the angle of the mirror surface of the right side-view mirror Msr to the initial angle is output, and the routine is returned. Thus, if the parallel running vehicle P departs from the right side blind spot Br, the mirror surface of the right side-view mirror Msr automatically returns to the initial angle.

If the routine advances to step S41 from step S14, it is determined whether the road on which the vehicle M is currently running is a straight road or a curvy road on the basis of the road shape information read in step S12. If the road is a straight road, the routine jumps to step S44. If the road is a curvy road, the routine advances to step S42. In step S42, it is determined whether the parallel running vehicle P (the passing vehicle O) has entered at least one of the left and right side blind spots Bl and Br. Since the determination procedure has been described above, redundant description is omitted. In one embodiment, the processing in steps S41 may serve as processing performed by a "curvy road determiner".

Figure 13:
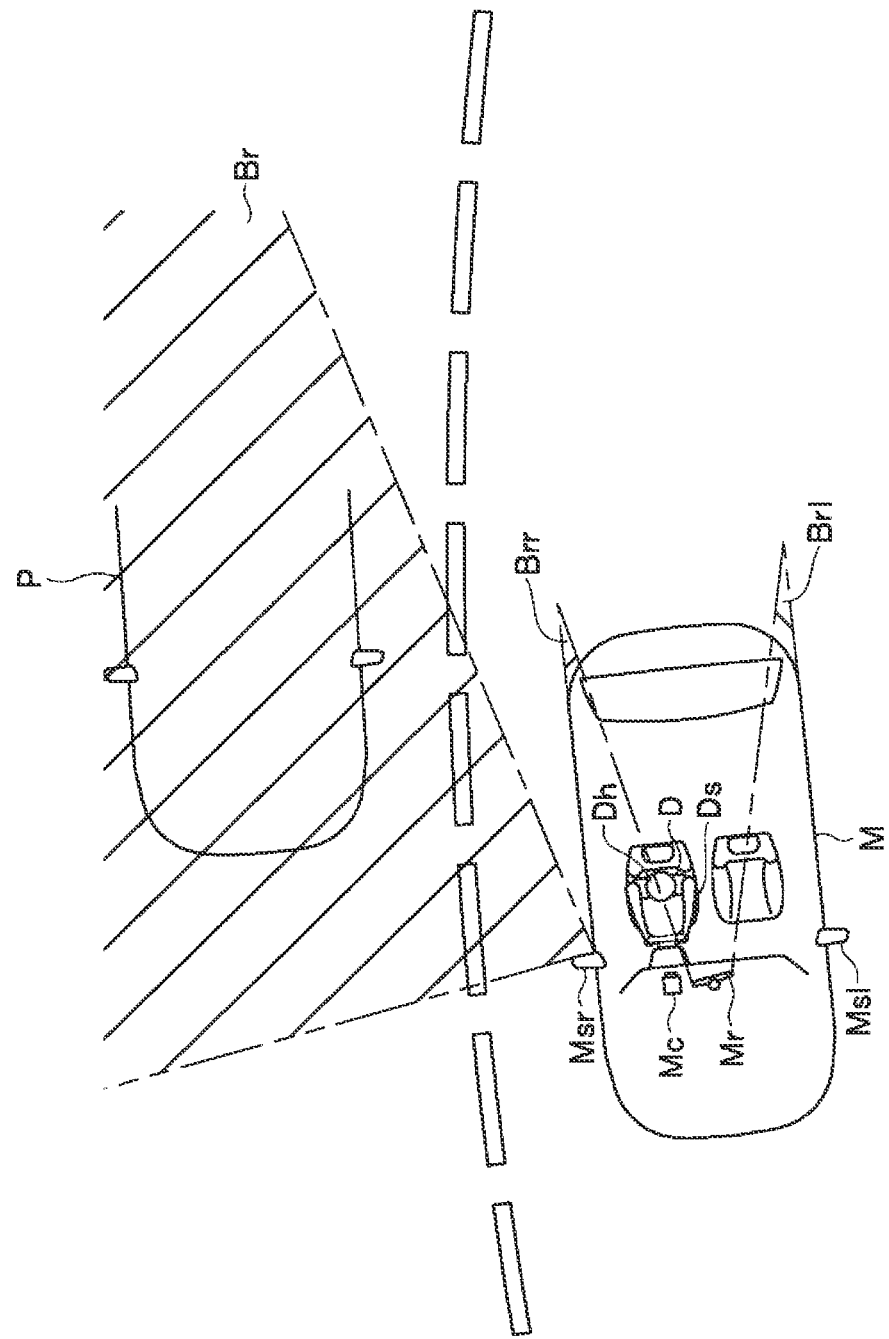
FIG. 13 schematically illustrates a case in which a parallel running vehicle entering a right side blind spot during running on a curvy road is reflected on a side-view mirror.

If the parallel running vehicle P (the passing vehicle O) has entered none of the left and right side blind spots Bl and Br, the routine advances to step S43. If it is determined that the parallel running vehicle P (the passing vehicle O) has entered one or both of the left and right side blind spots Bl and Br, the routine advances to step S44. Note that FIG. 13 illustrates a state in which the parallel running vehicle P has entered the right side blind spot Br.

If the routine advances to step S43 from step S41 or S42, it is determined whether both the actual angles θls and θrs detected by the left and right mirror angle detection sensors 34 and 35 are the initial angles. If the actual angles θls and θrs=the initial angles, the routine is returned. If one of the actual angles θls and θrs is the initial angle or if none of the actual angles θls and θrs are the initial angles, the routine advances to step S45. In step S45, an actuating signal for returning the angle of the mirror surface of the side-view mirror Msl or the side-view mirror Msr that is not at the initial angle to the initial angle is output, or actuating signals for returning the angles of the mirror surfaces of the side-view mirror Msl and the side-view mirror Msr that are not at the initial angles to the initial angles are output, and the routine is returned.

If the routine advances to step S44 from step S42, the notification device 28 notifies the driver D of a warning indicating "watch out for parallel running vehicle (watch out for passing vehicle)", and the routine advances to step S46. The warning indicates that the parallel running vehicle P (the passing vehicle O) is present on the side (the right side blind spot Br in FIG. 13) where entering of the parallel running vehicle P (the passing vehicle O) is detected. If the vehicle M is running on a curvy road, the driver D is more concentrated on the front than when running on a straight road. Thus, the driver D is unlikely to notice that the parallel running vehicle P (the passing vehicle O) has entered the left or right side blind spot Bl or Br. Accordingly, regardless of whether the vehicle M is going to change lanes, the driver D is notified of the warning. This enables the driver D to clearly see the parallel running vehicle P (the passing vehicle O) that has entered the left or right side blind spot Bl or Br if the vehicle M is running on a curvy road on which the driver D is likely to be concentrated on the front.

In step S46, a mirror angle Δθs is set, and the routine advances to step S47. By the mirror angle Δθs, the mirror surface provided for the side-view mirror Msl or the side-view mirror Msr or the mirror surfaces provided for the side-view mirror Msl and the side-view mirror Msr, on the side(s) where entering of the parallel running vehicle P (the passing vehicle O) is detected, is/are rotated to a position where the driver D is able to see the parallel running vehicle P (the passing vehicle O). The mirror angle Δθs may be either or both of Δθls and Δθrs. If the parallel running vehicle P (the passing vehicle O) has entered the left side blind spot Bl, Δθls is obtained; if the parallel running vehicle P (the passing vehicle O) has entered the right side blind spot Br, Δθrs is obtained. If the parallel running vehicle P (the passing vehicle O) has entered both the side blind spots Bl and Br, both Δθls and Δθrs are obtained.

In step S47, the actual angle θs and the maximum allowable angle θsmax from the reference angle 0° of the mirror surface are compared with each other. The actual angle θs may be either or both of θls and θrs. If the parallel running vehicle P (the passing vehicle O) has entered the left side blind spot Bl, θls is obtained; if the parallel running vehicle P (the passing vehicle O) has entered the right side blind spot Br, θrs is obtained. If the parallel running vehicle P (the passing vehicle O) has entered both the side blind spots Bl and Br, both θls and θrs are obtained.

If θs≤θsmax, the actual angle θs is within the movable range of the mirror surface, and thus, the routine advances to step S48. If θs>θsmax, the actual angle θs is beyond the movable range of the mirror surface, and thus, the routine is returned. Thus, both the actual angle θls and the actual angle θrs are obtained as the actual angle θs, and, if either or both of the actual angle θls and the actual angle θrs exceeds the maximum allowable angle θsmax, the mirror surface of the side-view mirror Msl or the side-view mirror Msr on the side on which the actual angle θs exceeds the maximum allowable angle θsmax is not operated, or the mirror surfaces of the side-view mirror Msl and the side-view mirror Msr on the sides on which the actual angles θs exceed the maximum allowable angle θsmax are not operated, and, it is needless to say that the rear-view mirror Mr is not operated either.

In step S48, an actuating signal corresponding to the side-view mirror control angle Δθs (side-view mirror actuating signal) set in step S46 is output to a mirror actuator (the left mirror actuator 31 or/and the right mirror actuator 32) on the side(s) on which the parallel running vehicle P (the passing vehicle O) is detected. In response to this, the angle adjusting mechanism provided for the side-view mirror (the left side-view mirror Msl or/and the right side-view mirror Msr) is actuated, the mirror surface(s) is rotated by the side-view mirror control angle Δθs, and the driver D can be made to see the parallel running vehicle P (the passing vehicle O) at the position of line of sight for normal driving.

Subsequently, the routine advances to step S49, and it is determined whether the curvy road has terminated. If the curvy road is continued, the routine is returned. On the other hand, if the curvy road has terminated, the routine advances to step S50. The termination of the curvy road is determined on the basis of image information from the onboard camera unit 21. Alternatively, the termination of the curvy road may be determined on the basis of a steering angle detected by a steering angle sensor. Further alternatively, the termination of the curvy road may be determined on the basis of a yaw rate detected by a yaw rate sensor.

In step S50, an actuating signal for returning the actual angle θs of the side-view mirror Msl or Msr on which the parallel running vehicle P is detected to the initial angle is output, or actuating signals for returning the actual angles of the side-view mirrors Msl and Msr on which the parallel running vehicle P is detected to the initial angles are output, and the routine is returned.

The value of the mirror angle movement flag F set in the above steps S23, S25, S36, and S38 is read in the rear-view mirror angle adjustment routine illustrated in FIG. 10.

In this routine, first, the value of the mirror angle movement flag F is examined in step S51. If F=1, that is, if the actual angle θs (θls and θrs) exceeds the movable range of mirror surfaces of the side-view mirrors Msl and Msr, the routine advances to step S52. If F=0, the routine advances to step S55.

In step S52, a rear-view mirror angle Δθr is set, and the routine advances to step S53. By the rear-view mirror angle Δθr, the mirror surface provided for the rear-view mirror Mr is rotated to a position where the driver D is able to see the passing vehicle O or the parallel running vehicle P. As illustrated by the dot-and-dash line in FIG. 12, for example, to make the driver D see the parallel running vehicle P, which has entered the right side blind spot Br, in the rear-view mirror Mr, first, an actual angle θr from the reference angle 0° is obtained. At the actual angle θr, the direction of the head Dh of the driver D and the direction of the parallel running vehicle P have an equal incident angle relative to the mirror surface of the rear-view mirror Mr. A difference between the actual angle θr and the initial angle is set as the mirror angle Δθr.

In step S53, the actual angle θr and a maximum allowable angle θmax from the reference angle 0° of the mirror surface are compared with each other, and it is determined whether the actual angle θr exceeds the maximum allowable angle θmax. If θr≤θmax, the actual angle θr is within the movable range of the rear-view mirror Mr, and thus, the routine advances to step S54. If θr>θmax, the actual angle θr is beyond the movable range of the mirror surface, and thus, the routine is returned.

In step S54, a rear-view mirror actuating signal corresponding to the rear-view mirror angle Δθr is output to the rear-view mirror actuator 33, and the routine is returned. In response to this, the angle adjusting mechanism provided for the rear-view mirror Mr is actuated, the rear-view mirror Mr is rotated by a predetermined angle. As a result, as illustrated by the dot-and-dash line in FIG. 12, the driver D can be made to see the parallel running vehicle P, which has entered the right side blind spot Br and is not seen in the right side-view mirror Msr, at the position of line of sight on the rear-view mirror Mr for normal driving.

On the other hand, if the routine advances to step S55 from step S51, it is determined whether the routine is the first routine after the value of the mirror angle movement flag F has become 0. If the routine is the first routine, the routine advances to step S56. In step S56, an actuating signal for returning the rear-view mirror angle Δθr to 0°, that is, the initial position, is output to the rear-view mirror actuator 33, and the routine is returned. On the other hand, if the routine is the second routine or the subsequent routine after the value of the mirror angle movement flag F has become 0, the routine is returned.

In the above manner, in this embodiment, first, on the basis of the position of the head Dh of the driver D seated in the driver's seat Ds and the angles of mirror surfaces of the left and right side-view mirrors Msl and Msr, the side blind spots Bl and Br that are difficult to see in the left and right side-view mirrors Msl and Msr are set. Subsequently, when the vehicle is going to change the direction (turn left or change lanes), if the parallel running vehicle P or the passing vehicle O running on the side to which the vehicle is changing the direction is detected by the left and right front side radars 22 and 23 and the left and right rear side radars 24 and 25, it is determined whether the parallel running vehicle P or the passing vehicle O has entered the side blind spot Bl or Br. If it is determined that the parallel running vehicle P or the passing vehicle O has entered the side blind spot Bl or Br, the angle of the mirror surface of the side-view mirror Msl or Msr is adjusted such that the driver D is able to see the parallel running vehicle P or the passing vehicle O at the position of their line of sight. This can prevent the driver D from feeling unsecured.

In addition, if the parallel running vehicle P or the passing vehicle O that has entered the side blind spot Bl or Br is not displayable in the movable range of the side-view mirrors Msl and Msr, the rear-view mirror Mr is rotated such that the driver D is made to see the parallel running vehicle P or the passing vehicle O in the rear-view mirror Mr. Thus, the parallel running vehicle P or the passing vehicle O can be seen in a wide range even if the parallel running vehicle P or the passing vehicle O has entered the side blind spot Bl or Br.

Note that the disclosure is not limited to the above-described embodiment, and, for example, the left and right side-view mirrors Msl and Msr may be electronic mirrors. In this case, mirror surfaces of the left and right side-view mirrors Msl and Msr serve as light receiving elements, and the monitor serves as the optical display. In addition, the cutting position of the image for which the light is received by the light receiving elements is adjusted to the position for displaying the parallel running vehicle P or the passing vehicle O that have entered the side blind spot Bl or Br for display on the optical display.

According to the embodiment of the disclosure, if the surrounding environment detector mounted on the vehicle determines that a moving object has entered any of blind spots of side-view mirrors provided on both sides of the vehicle, the display position of the optical display is adjusted to a position that enables the driver to see the moving object. This can prevent the driver from feeling unsecured by being unable to see the moving object that is present in the blind spot.

The mirror_ECU 12 illustrated in FIG. 4 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the mirror_ECU 12. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 4.

The invention claimed is:

1. A vehicle blind-spot reduction device to be applied to a vehicle, the vehicle blind-spot reduction device comprising:
   a left side-view mirror disposed on a left side of the vehicle and a right side-view mirror disposed on a right side of the vehicle;
   an actuator configured to move the left and right side-view mirrors to adjust angles of the left and right side-view mirrors relative to a reference position;
   a detector configured to detect the angles of the left and right side-view mirrors;
   a surrounding environment information acquirer configured to acquire information regarding objects present around the vehicle;
   a moving object detector configured to detect a moving object that is running beside the vehicle on a basis of the information acquired by the surrounding environment information acquirer;
   a driver monitor system configured to capture an image of a driver in a driver's seat of the vehicle to detect a position of the driver;
   a blind spot setter configured to:
      based on the position of the driver and the angles of the left and right side-view mirrors, estimate (1) first left-side and right-side regions of the vehicle that are recognizable by the driver using the left and right side-view mirrors, and (2) second left-side and right-side regions of the vehicle that are recognizable by the driver without the left and right side-view mirrors; and based on the first left-side and right-side regions and the second left-side and right-side regions, set left-side and right-side blind spots that are not recognizable by the driver with or without the left and right side-view mirrors;
a mirror adjuster configured to, based on determining that the moving object detected by the moving object detector has entered one of the left-side and right-side blind spots set by the blind spot setter, cause the actuator to adjust an angle of corresponding one of the left and right side-view mirrors to show the driver the moving object in the one of the left-side and right-side blind spots;
a rear-view mirror disposed in a cabin of the vehicle; and
a rear-view mirror adjuster configured to move the rear-view mirror to adjust an angle of the rear-view mirror,
wherein the rear-view mirror is a different mirror from the left and right sideview mirrors and is located between the left and right side-view mirrors in a vehicle width direction of the vehicle, and
wherein the mirror adjuster is further configured to, when an adjustment of the angle of the corresponding one of the left and right side-view mirrors by the actuator is not sufficient to show the driver the moving object in the one of the left-side and right-side blind spots, cause the rear-view mirror adjuster to adjust the angle of the rear-view mirror to show the driver the moving object in the one of the left-side and right-side blind spots.

2. The vehicle blind-spot reduction device according to claim 1, further comprising:
an operation detector configured to:
determine whether a right indicator switch or a left indicator switch is turned on; and
in response to determining that the right indicator switch or the left indicator switch is turned on, detect an operation for changing a running direction of the vehicle,
wherein, in response to (1) a detection of the operation for changing the running direction by the operation detector and (2) a determination that the moving object has entered the one of the left-side and right-side blind spots, the mirror adjuster causes the actuator to adjust the angle of the corresponding one of the left and right side-view mirrors to show the driver the moving object in the one of the left-side and right-side blind spots.

3. The vehicle blind-spot reduction device according to claim 1, further comprising:
a road shape acquirer configured to acquire a shape of a road on a basis of information on the shape of the road on which the vehicle is running, the information on the shape of the road being determined by a driving assistance control unit of the vehicle based on images captured by a camera of the vehicle; and
a curvy road determiner configured to determine whether the road is a curvy road on a basis of the shape of the road acquired by the road shape acquirer,
wherein, in response to (1) a determination by the curvy road determiner that the road is the curvy road and (2) a determination that the moving object has entered the one of the left-side and right-side blind spots, the mirror adjuster causes the actuator to adjust the angle of the corresponding one of the left and right side-view mirrors to show the driver the moving object in the one of the left-side and right-side blind spots.

4. A vehicle blind-spot reduction device to be applied to a vehicle, the vehicle blind-spot reduction device comprising:
a left side-view mirror disposed on a left side of the vehicle and a right side-view mirror disposed on a right side of the vehicle;
an actuator configured to move the left and right side-view mirrors to adjust angles of the left and right side-view mirrors relative to a reference position;
a rear-view mirror disposed in a cabin of the vehicle;
a rear-view mirror adjuster configured to move the rear-view mirror to adjust an angle of the rear-view mirror; and
circuitry configured to:
acquire the angles of the left and right side-view mirrors;
acquire information regarding objects present around the vehicle;
detect a moving object that is running beside the vehicle on a basis of the acquired information;
capture an image of a driver in a driver's seat of the vehicle to detect a position of the driver;
based on the position of the driver and the angles of the left and right side-view mirrors, estimate (1) first left-side and right-side regions of the vehicle that are recognizable by the driver using the left and right side-view mirrors, and (2) second left-side and right-side regions of the vehicle that are recognizable by the driver without the left and right side-view mirrors,
based on the first left-side and right-side regions and the second left-side and right-side regions, set left-side and right-side blind spots that are not recognizable by the driver with or without the left and right side-view mirrors; and
based on determining that the detected moving object has entered one of the left-side and right-side blind spots, cause the actuator to adjust an angle of corresponding one of the left and right side-view mirrors to show the driver the moving object in the one of the left-side and right-side blind spots,
wherein the rear-view mirror is a different mirror from the left and right sideview mirrors and is located between the left and right side-view mirrors in a vehicle width direction of the vehicle, and
wherein the circuitry is further configured to, when an adjustment of the angle of the corresponding one of the left and right side-view mirrors by the actuator is not sufficient to show the driver the moving object in the one of the left-side and right-side blind spots, cause the rear-view mirror adjuster to adjust the angle of the rear-view mirror to show the driver the moving object in the one of the left-side and right-side blind spots.

5. The vehicle blind-spot reduction device according to claim 1, wherein the surrounding environment information acquirer comprises a radar.

6. The vehicle blind-spot reduction device according to claim 4, wherein the circuitry is further configured to:
determine whether a right indicator switch or a left indicator switch is turned on;
in response to determining that the right indicator switch or the left indicator switch is turned on, detect an operation for changing a running direction of the vehicle; and
in response to (1) a detection of the operation for changing the running direction and (2) a determination that the moving object has entered the one of the left-side and right-side blind spots, cause the actuator to adjust the angle of the corresponding one of the left and right side-view mirrors to show the driver the moving object in the one of the left-side and right-side blind spots.

7. The vehicle blind-spot reduction device according to claim 4, wherein the circuitry is further configured to:
acquire a shape of a road on a basis of information on the shape of the road on which the vehicle is running, the information on the shape of the road being determined by a driving assistance control unit of the vehicle based on images captured by a camera of the vehicle;
determine whether the road is a curvy road on a basis of the shape of the road; and
in response to (1) a determination that the road is the curvy road and (2) a determination that the moving object has entered the one of the left-side and right-side blind spots, cause the actuator to adjust the angle of the corresponding one of the left and right side-view mirrors to show the driver the moving object in the one of the left-side and right-side blind spots.

8. A vehicle blind-spot reduction device to be applied to a vehicle, the vehicle blind-spot reduction device comprising:
a left side-view mirror disposed on a left side of the vehicle and a right side-view mirror disposed on a right side of the vehicle;
an actuator configured to move the left and right side-view mirrors to adjust angles of the left and right side-view mirrors relative to a reference position;
a rear-view mirror disposed in a cabin of the vehicle;
a rear-view mirror adjuster configured to move the rear-view mirror to adjust an angle of the rear-view mirror; and
circuitry configured to:
acquire the angles of the left and right side-view mirrors;
acquire information regarding objects present around the vehicle;
detect a moving object that is running beside the vehicle on a basis of the acquired information;
detect a position of a seat cushion of a driver's seat in a front-back direction;
based on the position of the seat cushion of the driver's seat and the angles of the left and right side-view mirrors, estimate (1) first left-side and right-side regions of the vehicle that are recognizable by a driver using the left and right side-view mirrors, and (2) second left-side and right-side regions of the vehicle that are recognizable by the driver without the left and right side-view mirrors;
based on the first left-side and right-side regions and the second left-side and right-side regions, set left-side and right-side blind spots that are not recognizable by the driver with or without the left and right side-view mirrors; and
based on determining that the detected moving object has entered one of the left-side and right-side blind spots, cause the actuator to adjust an angle of corresponding one of the left and right side-view mirrors to show the driver the moving object in the one of the left-side and right-side blind spots,
wherein the rear-view mirror is a different mirror from the left and right sideview mirrors and is located between the left and right side-view mirrors in a vehicle width direction of the vehicle, and
wherein the circuitry is further configured to, when an adjustment of the angle of the corresponding one of the left and right side-view mirrors by the actuator is not sufficient to show the driver the moving object in the one of the left-side and right-side blind spots, cause the rear-view mirror adjuster to adjust the angle of the rear-view mirror to show the driver the moving object in the one of the left-side and right-side blind spots.

9. The vehicle blind-spot reduction device according to claim 8, wherein the circuitry is further configured to:
determine whether a right indicator switch or a left indicator switch is turned on;
in response to determining that the right indicator switch or the left indicator switch is turned on, detect an operation for changing a running direction of the vehicle; and
in response to (1) a detection of the operation for changing the running direction and (2) a determination that the moving object has entered the one of the left-side and right-side blind spots, cause the actuator to adjust the angle of the corresponding one of the left and right side-view mirrors to show the driver the moving object in the one of the left-side and right-side blind spots.

10. The vehicle blind-spot reduction device according to claim 8, wherein the circuitry is further configured to:
acquire a shape of a road on a basis of information on the shape of the road on which the vehicle is running, the information on the shape of the road being determined by a driving assistance control unit of the vehicle based on images captured by a camera of the vehicle;
determine whether the road is a curvy road on a basis of the shape of the road; and
in response to (1) a determination that the road is the curvy road and (2) a determination that the moving object has entered the one of the left-side and right-side blind spots, cause the actuator to adjust the angle of the corresponding one of the left and right side-view mirrors to show the driver the moving object in the one of the left-side and right-side blind spots.

* * * * *